United States Patent [19]

Percec et al.

[11] Patent Number: 4,663,402

[45] Date of Patent: May 5, 1987

[54] NON-CATALYTIC PROCESS FOR THE PREPARATION OF DIFUNCTIONALIZED POLYARYLENE POLYETHERS

[75] Inventors: Virgil Percec, Pepper Pike; Gary S. Huvard, Akron; Floyd L. Ramp, Richfield; Lee Traynor, Akron, all of Ohio

[73] Assignee: The B. F. Goodrich Company, Akron, Ohio

[21] Appl. No.: 814,749

[22] Filed: Dec. 30, 1985

Related U.S. Application Data

[63] Continuation-in-part of Ser. No. 586,678, Mar. 6, 1984, Pat. No. 4,562,243.

[51] Int. Cl.$^4$ .................. C08G 65/48; C08G 75/23
[52] U.S. Cl. .................. 525/534; 525/535; 526/286; 526/287; 526/288; 526/289; 526/332; 526/333; 526/334
[58] Field of Search .................. 525/534, 535; 526/281–289, 332–334

[56] References Cited

U.S. PATENT DOCUMENTS

| | | | |
|---|---|---|---|
| 3,717,618 | 2/1973 | Oswald | 526/285 |
| 3,843,614 | 10/1974 | Doorakian | 525/534 |
| 4,116,936 | 9/1978 | Stelner | 526/286 |
| 4,258,175 | 3/1981 | Chen | 528/219 |
| 4,431,761 | 2/1984 | Hergenrother | 525/534 |
| 4,486,576 | 12/1984 | Colon et al. | 528/212 |
| 4,510,296 | 4/1985 | Hergenrother | 525/534 |
| 4,562,243 | 12/1985 | Percec | 525/534 |

Primary Examiner—John Kight
Assistant Examiner—M. L. Moore
Attorney, Agent, or Firm—Alfred D. Lobo

[57] ABSTRACT

A non-catalytic process converts oligomers of polyarylene polyethers (PAPE) having a mol wt $\overline{M}n$ in the range from 1000 to about 10,000 to difunctionalized oligomers so as, in the first instance, to provide a reactive double bond (for example, a vinylbenzyl group) at each end of the PAPE; and, in the second instance to provide a triple bond (benzylethynyl group) at each end of the PAPE. The solubility of intermediate bisphenolates of (i) a dihydric phenol, and of (ii) the PAPE oligomer in particular solvents which allow (a) water of reaction to be removed without being degraded, and (b) essentially complete end-capping of the oligomer chains with vinyl chain ends, are the keys to the novel process. The PAPE most preferably has a repeating unit which is the residuum of two dihydric phenols or thiophenols ("DHP") linked through a C=O, —S—S—, or —SO$_2$- group, or a Si or C atom, and/or ether O, or thioether S atoms. The preferred repeating unit is formed by reaction of a DHP such as bisphenol A (BPA) with a halogenated DHP such as dichlorophenyl sulfone (DCPS) so as to provide an alternating configuration. The repeating unit may also include a linking residue of a reactive solvent which residue provides chain extension in the backbone. An oligomer which is a homopolymer having a repeating unit in which at least four benzenoid rings are connected through ether O atoms, may also be difunctionalized. In particular, $\alpha\omega$-di(phenol)aromatic polyether sulfone oligomers ("APS") are esterified so as to have terminal methacrylyl groups; and, etherified so as to have styryl end groups which are thermally crosslinkable.

9 Claims, No Drawings

NON-CATALYTIC PROCESS FOR THE PREPARATION OF DIFUNCTIONALIZED POLYARYLENE POLYETHERS

Cross-reference to related application: This application is a continuation-in-part of Ser. No. 586,678 filed Mar. 6, 1984, to be issued as U.S. Pat. No. 4,562,243 on Dec. 31, 1985.

BACKGROUND OF THE INVENTION

This invention is particularly related to the preparation, without a phase transfer catalyst, of a polyarylene polyether ("PAPE") oligomer which is crosslinkable through its terminal vinyl groups, preferably thermally, and when crosslinked is capable of withstanding thermal degradation at a temperature in the range from above 150° C. to about 200° C.

This invention is more particularly related to difunctional polymers of dihydroxybenzene, dihydroxynaphthalene, and diphenols, all referred to herein as dihydric phenols ("DHP"), and the corresponding sulfur (thio) compounds referred to as dihydric thiophenols ("DHTP"), which polymers have a $\overline{M}n$ (number average mol wt) less than about 10,000, hence termed oligomers. One or the other DHP and DHTP, or both, are referred to herein as "DH(T)P" for brevity. Such oligomers are defined herein as polymers containing from 2 to about 100 repeating units each having the formula —DH(T)P-$R^s$—, where $R^s$ represents the residue of a compound which provides a reactive linking group. These oligomers contain at least three phenyl or thiophenyl rings which may have inert substituents, each ring linked to another through an O, Si, C or S atom. Such DHP and DHTP oligomers, also, poly[DH(T)P], or [DH(T)P]$_n$, are terminated at each end (hence "diterminated") with a phenol ("Ph") or thiophenol ("TPh") group respectively, which group may also have inert substituents. For brevity, "di-(T)Ph-terminated" refers herein to either or both oligomers which are Ph- and TPh-terminated respectively.

These oligomers are macromonomers ("macromers" for brevity) which are disclosed in copending Ser. No. 586,678 filed Mar. 6, 1984, issued Aug. 20, 1985 as U.S. Pat. No. 4,536,360 the disclosure of which is incorporated by reference thereto as if fully set forth herein.

A wide variety of macromers are known with one polymerizable vinyl head group, each of which macromers may be tailored in $\overline{M}n$ and structural configuration to provide polymers with a wide spectrum of physical properties. Typical of such macromers are those with styryl and acrylate head groups disclosed by Kennedy, J. P. et al in I.U.P.A.C. *Intl. Symp. on Macromolecules,* Florence, Preprints, p 162 (1980); *Polym. Prepr. Am. Chem. Soc. Div. Polym.Chem.,* 23, No. 2, 99 (1982); *Polym. Bull.,* 6,] 35 (198]); inter alia.

Macromers have also been synthesized by Tsuruta by a polyaddition reaction of divinyl compounds (*Makromol. Chem.* 183 29-45, 1981), and by Hudecek by transformation of reactive polymer end groups (Polym. Bull. 3 143, 1980).

A thermoset product, disclosed in U.S. Pat. No. 4,116,936 to E. C. Steiner, may be a crosslinked homopolymer of bisphenol A(BPA) with styryl chain ends, or the epoxy (BPA-diglycidyl ether) copolymer, also with styryl chain ends. Though Steiner's epoxy and applicants' PAPE each have styryl chain ends, the main chains are similar only in that each has a BPA repeating unit. The polymers belong to different classes and have different properties. As is well known, BPA is also a repeating unit in polycarbonates, phenolformaldehyde resins, and in numerous other polymers none of which is a polyether. Steiner's process used acetone, methanol and benzene as solvents because he was unconcerned with removing water. Moreover, his polymers were not susceptible to the partitioning of the solvents into the polymers when they are to be recovered, which is what occurs with such solvents when our PAPE end-capped oligomers are to be recovered.

Poly(phenylene oxide) ("PPO" for brevity) may be difunctionalized by esterification as is disclosed in "Reactions of Poly(phenylene Oxide)s with Quinones. I. The Quinone-Coupling Reaction Between Low Molecular Weight Poly(2,6-Dimethyl-1,4-phenylene oxide) and 3,3',5,5'-tetramethyl-4,4'-Diphenoquinone", by Dwain M. White, *Jour. of Polym. Sci., Polym. Chem. Ed.,* Vol 19, 1367-1383 (1981). Other difunctionalized PPO oligomers are disclosed in U.S. Pat. No. 3,663,625 to Neville, R. G. None of the prior art syntheses was concerned with reaction of alkali metal salts ("bisphenolates") of at least one of the $R^s$-linked DH(T)P oligomers formed as described, which salts are essentially insoluble at room temperature, or only soluble in the aforementioned solvents at elevated temperatures in the range from about 70° C. to about 150° C. at ambient pressure, yet may be either esterified or etherified essentially quantitatively. As defined herein, Ph-terminated polyphenylene ("PP") is an oligomer of a dihydric phenol (DHP), namely 1,4-dihydroxybenzene or hydroquinone ("HQ") which may be inert substituents, in which oligomer the backbone includes at least three phenyl rings, one connected to another through an ether O atom; or, PPO oligomers which are $R^s$-linked.

In all the foregoing prior art teachings, the macromer was produced in an organic liquid phase in which the reactants were relatively easily soluble. The bisphenolates used in the preparation of the PAPE oligomers of this invention are only difficultly soluble even in agressive solvents such as glymes, dimethyl sulfoxide ("DMSO"), and dimethylformamide ("DMF"). Because of this solubility problem, Ser. No. 586,678 disclosed a process in which a major molar amount of a phase transfer catalyst was used in aqueous alkaline conditions to form the bisphenolate of the BPA, then form the BPA-DPS oligomer, finally provide it with terminal vinyl groups at the ends of its chains. The problem of making the precursor dialkali metal salt of the BPA is exacerbated because the reaction proceeds satisfactorily only under substantially anhydrous conditions, that is, where less than 10 mole% water, and preferably less than 3 mole% water is present, and the water formed during the formation of the bisphenolate must be removed while the reaction is in progress, or the precipitated salt is subject to hydrolysis.

It is known that polymers of BPA DPS are prepared in a DMSO solution as disclosed in U.S. Pat. No. 4,108,837 to Johnson et al. But the BPA-DPS oligomer we made according to the Johnson et al process could only be partially end-capped with VB end groups. When this oligomer was fully cured its $T_g$ was below 150° C. We eventually traced this low $T_g$ to be the result of small quantities of degradation products of DMSO. When this was recognized, it was decided to circumvent the problem of degradation by carrying out the distillation under vacuum. This proved to be crucial to provide substantially quantitatively VB end-capped oligomers which cured to a $T_g$ above 150° C. Most of all, it must be recognized that, having produced the BPA-DPS bisphenolate in DMSO solution without the formation of deleterious degradation products, there was no indication that the reaction of ClMS would go to completion. End-capping essentially all the chains is crucial to provide the high $T_g$ sought. Remnant OH-terminated chains cannot be separated from the VB-terminated chains and depress the $T_g$ below 150° C. Comparable depression of $T_g$ will be expected in other difunctionalized PAPEs.

We know of no instance where a sodium or potassium salt or other bisphenolate of a di-Na or K salt of a DH(T)P (e.g. BPA) has been prepared which is substantially insoluble in commonly available organic solvents at room temperature, yet has been used to provide a salt solution essentially free of degradation products of the solvent. Nor do we know of any instance where the salt solution is used to obtain substantially complete conversion of a PAPE oligomer such as BPA-DPS to its bisphenolate which, in turn, has essentially all its chains end-capped, all reactions being carried out without a phase transfer catalyst.

The process of our invention provides for such reactions with DH(T)Ps, and also OH-terminated oligomers of a large variety of polyDH(T)P linked through a number of different $R^s$. The foregoing process requirements uniquely characterize the formation of the difunctionalized PAPEs of this invention, and the ability to meet these requirements permits the commercialization of these PAPEs.

Among these PAPE oligomers are (a) aromatic polyether and polythioether sulfones (all referred to as "APS" for brevity) in which the $R^s$ is a diphenyl sulfone (DPS) residue of a dihalophenyl sulfone (DHPS) linking group; (b) PPO oligomers linked with a diphenoquinone linking group, as disclosed in White, supra; and (c) aromatic polyethers and thioethers in which the $R^s$ is not a sulfone. When the DHP is bisphenol A, and the $R^s$ is DPS, the repeating unit is bisphenol A sulfone ("BPAS"); when the DHTP is bisthiophenol A, the repeating unit is bisthiophenol A sulfone ("BTPAS"), both of which sulfones are together referred to herein as 'bis(thio)phenol A sulfones', and for brevity, "B(T)PAS". As a result, salts of a wide spectrum of DH(T)P oligomers with terminal OH or SH groups may be esterified or etherified to contain terminal reactive vinyl, and more specifically VB groups, which VB-containing oligomers may then be thermally polymerized rapidly to yield solvent-resistant materials.

The difunctionalized DH(T)P oligomers are excellent molding resins which upon crosslinking are thermally stable while maintaining strength at about 200° C. They may also be used as an intermediate for the synthesis of other compounds. For example, the di(-styrenated) oligomer may subsequently be converted to an $\alpha,\omega$-di(ethynylbenzyl) PAPE which has terminal triple bonds known to be desirable for the development of thermally curable matrix resins for lightweight composite materials, without the evolution of volatile by-products. (See P. M. Hergenrother, *J. Polym. Sci., Polym. Chem. Ed.*, 20, 3131 (1982).

SUMMARY OF THE INVENTION

It has been discovered that a soluble poly[DH(T)P], namely a $[DH(T)P]_n$ oligomer ($n=2$ to about 100) of at least one DH(T)P monomer in which oligomer each phenyl ring is connected to another through an O, Si, C or S atom, may be either esterified or etherified so as to yield a difunctionalized oligomer di-$[DH(T)P]_n$ with vinyl unsaturation at each of its chain ends, by a non-catalytic reaction in solution ("solution reaction") with particular solvents in the presence of base and/or salt, at a pressure and temperature below that at which solvent degradation occurs, or the functionalized chain ends are substantially crosslinked.

The process of this invention stems from the discovery that conducting the aforesaid solution reaction in a practical period of time requires relatively high temperatures, and that the presence of water, formed during the conversion of DH(T)P to its di-alkali metal salt ("bisphenolate"), interferes with the subsequent formation of the oligomer.

It was also discovered that only certain aprotic solvents could provide the requisite solubility for (i) the bisphenolate (say, of BPA), (ii) the compound providing the linking group (say dichlorodiphenyl sulfone "DCPS"), and, (iii) the di-alkali metal salt of the PAPE oligomer which is to be end-capped. Preferred among such solvents are sulfone and sulfoxides including DMSO, and glymes, and DMF, optionally in combination with aromatic solvents, particularly halogenated aromatic solvents to provide an azeotrope upon vacuum distillation.

It is therefore a general object of this invention to provide a solution reaction in which an OH- SH-terminated $[DH(T)P]_n$ of at least one DH(T)P monomer may be (i) etherified or (ii) esterified, with an $\alpha,\beta$-unsaturated haloacyl reactant ("HAR") so as to form a PAPE oligomer with vinyl chain ends.

It has also been discovered that a soluble PAPE oligomer having a repeating unit in which a DH(T)P is linked through a linking residue $R^s$, defined hereinafter, may be difunctionalized in solution economically using a single reactor, in three steps, hence referred to as a "single-pot, three-stp process", which process comprises, in a first step, forming a bisphenolate of a DHP (such as BPA) in an aprotic solvent such as DMSO, glyme or DMF, at elevated temperature below that required to degrade such solvent and sufficiently high to distill the water of raction formed, while maintaining the reaction mixture under substantially anhydrous conditions; in a second step, forming a salt of the PAPE oligomer at an oligomerization temperature below that required to crosslink the HAR; and, in a third step, reacting the PAPE oligomer formed with the HAR at a temperature below that at which functionalized chain ends formed on said PAPE oligomer, will be substantially crosslinked; all steps being carried out in the absence of a phase transfer catalyst.

Further, it was discovered that using DMSO as the most preferred solvent at ambient pressure required temperatures high enough to produce small amounts of DMSO degradation products which negated satisfactory production of a difunctionalized APS ("DAPS") oligomer, when then led to distilling the reaction mixture under vacuum concurrently with conducting the non-catalytic reaction to form the bisphenolate.

It is a specific object of this invention to provide a DAPS oligomer having a BPA-DPS repeating unit, or a BTPA-DPS repeating unit, optionally with plural linking residues $R^s$, by a process comprising, (A) etherifying a salt of the APS with (i) a haloalkyl-vinyl aromatic compound, or (ii) a haloallylic compound, or (B) esterifying the salt with a (meth)acryloyl halide, or other monomeric moiety with a reactive leaving group, essentially quantitatively, in the absence of a phase transfer catalyst, so as to yield a functional head at each end of the oligomer.

DETAILED DESCRIPTION OF PREFERRED EMBODIMENTS

Our invention is particularly directed, in its broad application, to the preparation of a difunctionalized substantially linear crosslinkable thermoplastic polyarylene polyether oligomer, or polyarylene polythioether oligomer (PAPE) represented by the formula:

wherein, R represents O or S in an ester or ether linkage with $R^e$;

$R^e$ represents a residuum containing a terminal carbon to carbon double bond at each end of the PAPE oligomer; and, "PAPE" represents the residuum of the PAPE oligomer.

In its more preferred embodiment, the difunctionalized oligomer is represented by the formula:

wherein, n is an integer in the range from 2 to 100;

R, and $R^e$ have the same connotation as hereinbefore; and,

["DH(T)P"] is the residuum of dihydric phenol or dihydric thiophenol moieties linked through a linking residue $R^s$ so as to form a repeating unit

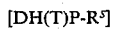

and, $R^s$ represents the residuum of a reactive linking group selected from the group consisting of the same or another [DH(T)P]; a dihaloalkane having from 1 to about 18 carbon atoms, more preferably a α,ω-dihalolower alkane such as dichloromethane; phosgene; alkyl diacid halides such as adipoyl chloride; aryl diacid halides such as terephthaloyl chloride; dihalophenyl phosphonates such as dichlorophenyl phosphine oxide (or dichlorophenyl phosphonate "DCPP"); dihaloaryl having six ring carbon atoms, such as dibromoxylene; bis(haloalkoxy)alkanes such as bis(chloromethoxy)butane ("BCMB"); and, dihalocycloalkanes having from 3 to 7 ring carbon atoms such as bis(chloromethyl)cyclohexane. More than one DH(T)P and more than one $R^s$ may be present in an oligomer.

Preferred [DH(T)P]$_n$ are oligomers formed from one or more dihydric phenols or thiophenols having a structure selected from

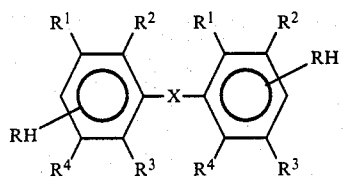

and

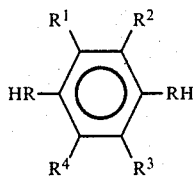

wherein, R represents O or S;

X represents a bond between aromatic carbon atoms or a divalent connecting radical selected from the group consisting of CO=O, —O—, —S—, —S—S—, —SO$_2$—, —Si— and divalent organic hydrocarbon radicals such as alkylene, alkylidene, cycloaliphatic, or the halogen, alkyl, aryl, or like substituted alkylene, alkylidene and cycloaliphatic radicals as well as alkarylene, cycloalkyl and aromatic radicals, and a ring fused to both Ar groups; and, $R^1$, $R^2$, $R^3$, and $R^4$ referred to herein as inert substituents may, if present, each be the same or different and represent halogen, particularly chlorine or bromine; NO$_2$; alkyl having from 1 to about 18 carbon atoms, without regard for the spatial configuration such as normal, iso or tertiary; alkoxy having from 1 to about 18 carbon atoms; and, hydrogen.

As written in the structural formulae, it will be evident that a polynuclear phenol will have an RH on each phenyl ring, while mononuclear phenols have both RH on the ring, most preferably para- to each other, such substituents as may be present occupying one or more other positions on the ring.

When $R^s$ is a DH(T)P it is present in the backbone in an alternating configuration with the other DH(T)P. Reaction between the DH(T)P and the $R^s$ (also a DH(T)P) is effected with an electron withdrawing group as an activator to facilitate reaction between the two DH(T)Ps. For example, when one is BPA and the other (the $R^s$) is DCPS, the SO$_2$ group is the activator, and the terminal Cl atoms react with the H of the BPA to provide an oligomer with the alternating configuration. The identity of the activator group is not critical as long as it is inert in the reaction coupling with DHPs in the alternating configuration. Thus it will now be evident that when either of the DH(T)Ps is a diphenol linked with a weak activator group such as —O—, —S—, —S—S— or —Si—, then the other DH(T)P should be a diphenol linked with a strong activator group such as —CO— or —SO$_2$— to provide the alternating configuration. Most preferred are the strong activating groups such as the sulfone which bonds two halogen substituted benzenoid nuclei as in the 4,4'-dichlorodiphenyl sulfone and 4,4'-difluorodiphenyl sulfone, although such other strong withdrawing groups as hereinbefore mentioned may also be used with ease.

The alkyl substituents may be cyclic or acyclic, including alkyl-substituted cyclic, as long as the total carbon content conforms to the defined amount, and the same is true for alkoxy groups, provided all substituents are inert under reaction conditions. The inert substituents may be the same or different, though it will be apparent that some substituents will be easier than others for steric and other reasons.

Thus, it is seen that the particular structure of the dihydric phenol moiety is not narrowly critical. However, as would be expected, this moiety or residuum in the polymer chain can alter or vary the properties of the resultant polymer produced. Similarly, the reaction rate, optimum reaction temperature and like variables in the process can be varied by the selection of the particular dihydric phenol so as to give any desired change in rate, temperature, physical properties of the polymer and like changes.

It is also contemplated in this invention to use a mixture of two or more different dihydric phenols to accomplish the same ends as above. Thus when referred to above, the [DH(T)P] residuum in the polymer structure can actually be the same or different aromatic residue.

As herein used the DH(T)P term defined as being the "residuum of the dihydric phenol" of course refers to the residue of the dihydric phenol after the removal of the two H atoms from the two aromatic hydroxyl groups. Thus as is readily seen these polyarylene polyethers contain recurring groups of the residuum of the dihydric phenol and the residuum of the reactive linking group, if such is present, or the residuum of another DH(T)P, bonded through aromatic ether oxygen or thioether atoms.

It is preferred that two DH(T)P compounds be used, the first of which is a bisphenol type of compound, and the other a dihalobenzenoid compound which has the two halogens bonded to benzene rings having an electron withdrawing group in at least one of the positions ortho and para to the halogen group. The dihalobenzenoid compound can be either mononuclear where the halogens are attached to the same benzenoid ring, or polynuclear where they are attached in different benzenoid rings, as long as there is an activating electron withdrawing group in the ortho or para position of that benzenoid nucleus.

Any of the halogens may be the reactive halogen substituents on the benzenoid compounds. Fluorine and chlorine substituted benzenoid reactants are preferred; the fluorine compounds for fast reactivity and the chlorine compounds for thier inexpensiveness.

More preferred are dihydric polynuclear phenols of the following four types including the derivatives thereof which are substituted with inert substituents:

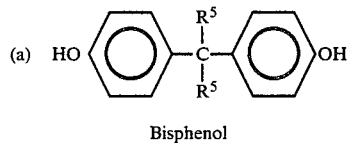

Bisphenol

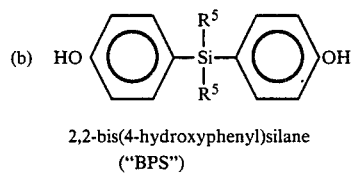

2,2-bis(4-hydroxyphenyl)silane ("BPS")

in which $R^5$ represents hydrogen, lower alkyl having from 1 to about 5 carbon atoms, phenyl and the halogen substituents thereof, and $R^5$ may each be the same or different.

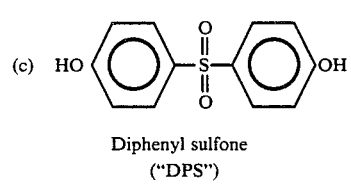

Diphenyl sulfone ("DPS")

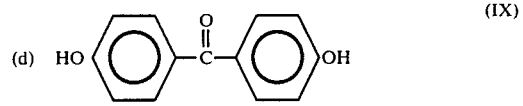

Diphenyl ketone ("DPK")

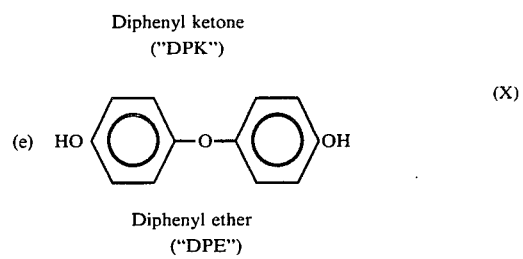

Diphenyl ether ("DPE")

Most preferred are PAPE oligomers in which $R^s$ is a terminally halogenated DHP and the other DH(T)P is also a DHP, there being no additional $R^s$ present. Such oligomers are exemplified by alternating configurations of VI and VIII; VI and IX; VI and X; VIII and X; VII and IX; and IX and X, which oligomers are then difunctionalized by the process of this invention to yield difunctionalized poly[dihydric phenols] ("di-[DHP]" for brevity).

Examples of the particular foregoing polynuclear phenols, and others referred to by the structure (IV) are given in U.S. Pat. No. 4 108,837 the disclosure of which is incorporated by reference thereto as if fully set forth herein.

This new class of reactive oligomers undergoes fast curing, and VB-terminated APS oligomers in particular, yield thermally cured PAPE networks with $T_g$ values equal to or higher than those of conventional high mol wt PAPE materials.

A conventional esterification of a di-(T)Ph-terminated $[DH(T)P]_n$ oligomer proceeds in solution so as to be esterified with an $\alpha,\beta$-unsaturated haloacyl reactant. The vinyl-containing reactant is referred to herein as "HAR". The [DH(T)P] oligomer consists essentially of repeating units each of which consists of $R^s$-linked DH(T)P residua as defined hereinabove.

A conventional Williamson etherification takes place, also in solution, in a reaction mixture in which the solvent for the bisphenolate of the DHP oligomer boils above the boiling point of the water of reaction formed, under the conditions of the reaction, so substantially anhydrous conditions of reaction may be mainatined by removing water by distillation. This requirement is of particular interest because preferred Ph- or TPh-terminated $[DH(T)P]_n$ are those in which $R^s$ is also the dihydric phenol [DHP] residuum, namely a diphenyl sulfone (DPS) residue of a DHPS; and, the other DHP is BPA or a substituted 1,4-dihydroxybenzene (HQ). The oligomer formed is represented by the formula $$R^e\text{—O—BPA—O—DPS—BPA—}_n\text{—O—}R^e$$

wherein BPA and DPS represent the residua of BPA and DHPS. The DHPS may be represented by the structure

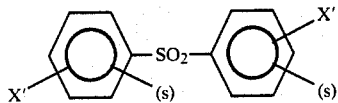 (XI)

wherein the ring may have inert substituents "(s)" and X' is selected from fluorine, chlorine, bromine and iodine.

In the particular example of a specific APS, namely an oligomer of BPA and 4,4'-dichlorodiphenyl sulfone ("DCPS") which is $R^s$, or BTPA and DCPS, the oligomer is formed by reaction of an alkali metal salt of the BPA, or BTPA preferably the potassium or sodium salt, and DCPS in anhydrous DMSO. The chain length of the APS oligomer formed is controlled by the relative ratio of BPA or BTPA and DCPS, a relatively lower $\overline{Mn}$ being obtained with a molar excess of BPA or BTPA; the larger the excess, the lower the $\overline{Mn}$. Preferred is a molar excess of BPA the amount of BPA being calculated to provide a desired average mol wt as is known in the art (see for example, "Textbook of Polymer Chemistry" by Paul J. Flory, inter alia), so that each chain end is BPA, and there is no essentially no excess BPA left. Most preferred is a ratio of BPA/DPCS=3/2.

As will immediately be realized, chain growth is propagated at active sites which are terminated with the alkali metal and the salt of the growing polymer remains soluble in the DMSO or DMSO/xylenes mixture under reflux conditions at which a mixture of the organic solvent and water is distilled off and condensed, the water separated from the condensate, and the organic solvent returned.

Most preferred solvents for the reaction mixture are sulfoxide and sulfone solvents having the formula

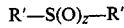

wherein R' represents a monovalent hydrocarbon group free of aliphatic unsaturation on the alpha carbon atom, and preferably contains less than about 8 carbon atoms or when connected together represents a divalent alkylene group with z being an integer from 1 to 2 inclusive. Thus, in all the most preferred solvents each oxygen and two carbon atoms are bonded directly to the sulfur atom. R' is more preferably lower alkyl having from 1 to about 4 carbon atoms, phenyl, alkyl phenyl, as well as those where the R' groups are interconnected as in a divalent alkylene bridge as in thiophene oxides and dioxides.

For convenience, the foregoing solvents may be used in combination with benzene, toluene and xylene which may be chlorinated to provide a particularly desirable azeotropic mixture.

Common HAR monomers are haloalkyl vinyl ethers having from 3 to about 20 carbon atoms, haloalkyl vinyl aromatic compounds having from 9 to about 30 carbon atoms, isophthaloyl and terephthaloyl chloride, acryloyl chloride and methacryloyl chloride, together referred to herein as (meth)acryloyl chloride, terminally monohalogenated α,β-unsaturated olefins having from 4 to about 18 carbon atoms, for example allyl chloride, chloromethylallyl benzene, allylchloroformate, allylchlorodimethylsilane and the like. Also, HAR oligomers are selected from oligomers having a $\overline{Mn}$ less than about 10,000 and preferably less than about 5,000, a terminal haloalkyl group, and a vinyl group at the other end.

Though VB end groups are most preferred, any HAR with a comparably reactive halogen atom at one end and a vinyl group at the other, will provide excellent reaction rates and yields. Similarly, though methacryloyl chloride is the most preferred HAR for esterification, numerous available terminally monohalogenated α,β-unsaturated olefins may be used, most preferably if they include an allylic halide group. For example, 1-chloro-2-hexene is an HAR with desirable allylic halide characteristics. Also useful, but providing a slower reaction rate, is 6-chloro-1-hexene, which is not an allylic halide.

In the specific instance where the DHP is BPA, and the $R^s$ is DCPS, the difunctionalized oligomer has a backbone which includes a repeating unit [DPS-BPA], it being evident that when either moiety in the repeating unit is substituted with inert substituents, the repeating unit will be represented by [DPS(s)-BPA(s)] where (s) represents H or $R^1$, $R^2$, $R^3$ or $R^4$. Analogously, when the DHTP is BTPA, the repeating unit will be represented by [DPS(s)-BTPA(s)].

Though it is evident that the DH(T)P must always be a dihydric(thio)phenol, that is, have a single OH or SH group on each phenyl ring, it is not essential that the OH or SH group be at the 4-position, though this is the most convenient.

The physical and chemical properties of the di-[DH(T)P] oligomer formed may be tailored by the choice of the substituted (or not) DHP or DHTP or $R^s$ used. Alkylation, alkoxylation or halogenation of BPA or BTPA or HQ yields a mixture of substituted products, alkylated products being most preferred among which the ortho-substituted BPA or BTPA predominates.

When the [BPA-DPS] oligomer is to be esterified so that $R^e$ includes a methacrylyl end group, R being O and connected to $R^e$ with an ester linkage in the formula (II) at each end, the di-esterified oligomer is represented by the formula:

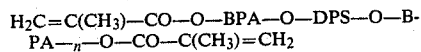

wherein n is an integer in the range from 2 to about 20.

Analogously, esters of oligomers with the following repeating units are esterified: [DPS-DCPP]; [BPA-DPK]; [BPS-DPK]; [DPE-DPS]; [DPK-DPS]; [BPS-DPS]; [DPS-HQ]; [BPA-DCPP]; [BPA-BCMB]; [BPA-CO-HQ]; [BPA-CH2-HQ]; [BPA-DPS-HQ]; [BPA-DPS-BPS]; [BPA-DPS-DPK]; [BPA-DPS-DPE]; [PPO] wherein the monomer is 2,6-dimethyl phenol; [BPA-CH2-Ph-CH2-BPA] wherein Ph represents a phenyl ring; and, [BPA-CH2-Ph-CH2-HQ] wherein HQ represents hydroquinone.

When the [BPA-DPS] oligomer is to be etherified, for example, distyrenated so as to include a vinylbenzyl (VB) group at each end, the distyrenated APS is represented by the formula:

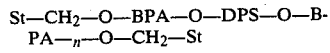

wherein "St" represents a styryl group and n is an integer in the range from 2 to about 20.

Analogously, ethers of oligomers with the following repeating units are esterified: [DPS-DCPP]; [BPA- DPK]; [BPS-DPK]; [DPE-DPS]; [DPK-DPS]; [BPS-DPS]; [DPS-HQ]; [BPA-DCPP]; [BPA-BCMB]; [BPA-CO-HQ]; [BPA-CH$_2$-HQ]; [BPA-DPS-HQ]; [BPA-DPS-BPS]; [BPA-DPS-DPK]; [BPA-DPS-DPE]; [PPO] wherein the monomer is 2,6-dimethyl phenol; [BPA-CH$_2$-Ph-CH$_2$-BPA] and, [BPA-CH$_2$-Ph-CH$_2$-HQ].

The difunctionalized PAPE oligomers formed by our process may be used for a host of different purposes, depending upon whether they are homopolymers, ordered polymers, or copolymers, their molecular weight, $T_g$, and related chemical and physical properties.

A relatively high mol wt oligomer in the range from about $\overline{Mn}$ 5000 to about 10,000 may be cured with a conventional free radical initiator or simply thermally crosslinked while it is being injection molded into pump housings and the like. The crosslinked oligomer is an engineering plastic which has excellent solvent resistance quite unlike commercially available PAPE, for example Udel$^R$ APS which is available is a $\overline{Mn}$ in the range from about 20,000 to about 50,000, but with comparable physical strength. Lower mol wt difunctionalized oligomers in the range from about 1000 to about 5000 may be crosslinked by themselves, or in solution with any monomer or macromer with a reactive vinyl group. Still another use of the difunctionalized PAPE oligomers is for blending with polymers to improve the processability of the blend and increase the $T_g$ of the finished product because of the generally high $T_g$ contributed by the di-[DH(T)P]$_n$ after crosslinking.

It will be appreciated that the bisphenolate may be prepared separately, if desired, using any conventional process, and an excess of the anhydrous bisphenolate may then be used in a suitable aprotic solvent in which oligomerization is effected, and subsequently, the oligomer is end-capped. However, from a commerical point of view, it will be evident that it is more economical to perform all the necessary operations in a single reactor.

In a typical process for the styryl termination of a BPA-DPS oligomer, the first step is to dissolve BPA in DMSO, or a mixture of DMSO and xylenes, under a N$_2$ blanket, and add aqueous alkali metal salt solution slowly while the reaction mixture heats up to reflux temperature. A vacuum of about 100 mm Hg is maintained and the overhead condensed. Water is removed from the condensate and the water-free condensate is returned to the reactor. Distillation starts at less than 70° C. when a mixture of xylenes water and some DMSO are distilled overhead and condensed, with the xylenes being returned; distillation is complete at about 125° C. when all xylenes are removed, leaving a solution of the BPS-bisphenolate in soluton in the DMSO. In the second step, the reactor is cooled to about 70° C. and DCPS dissolved in DMSO is added with stirring and heating under N$_2$ until oligomerization, that is forming the BPA-DPS bisphenolate of the oligomer, is completed. In the third step, the reactor is cooled to about 40° C. and chloromethylstyrene (CIMS) is slowly added until all chains are end-capped.

EXAMPLE 1

The following illustrative example is for the preparation of a styryl-terminated BPA-DPS oligomer in a pilot plant reactor using an azeotropic mixture of xylenes and DMSO as the solvent for the preparation of the dialkali metal salt of BPS (BPA-bisphenolate):

First Step:

Dissolve 1.4 kg of BPA in 3 liters of DMSO and 4 liters of mixed xylenes and add 0.78 kg of 50% aqueous KOH slowly, in a jacketed reactor. The overhead from the reactor is led to a condenser in which a phase separation of the condensate occurs. The reactor is flushed with N$_2$ and the solution of BPA in aqueous KOH is warmed to reflux while a vacuum of about 100 mm Hg is drawn on the reactor which is provided with a stirrer.

Overhead vapors commerce to condense when the reaction mass reaches about 70° C., and the temperature is slowly raised further until it reaches about 125° C. The water phase from the condenser is continuously withdrawn and discarded and the xylene phase is returned to the reaction.

When all the water is removed, distill off the xylene and recover it for reuse in a later run.

Second Step:

Weigh out 1.174 kg of DCPS and add about 1.5 to 2 liters of DMSO to it, then heat to about 90° C. Cool the reactor to 60°–80° C. then charge the DCPS to the reactor. Heat the reaction mixture while stirring to 160° C. under a N$_2$ blanket until the oligomerization is complete. Finely divided KCl salt is precipitated; the bisphenolate of the oligomer remains in solution.

Third Step:

Cool the reactor down to about 45° C. and slowly add 0.645 kg ClMS making sure the temperature does not exceed 50° C. and allow the reaction to proceed until all the oligomer chains are end-capped. Then recover the difunctionalized BPA-DPS oligomer with a conventional work-up, for example, by precipitating the DAPS in water followed by washing with methanol.

The sequence of reactions is set forth hereinbelow:

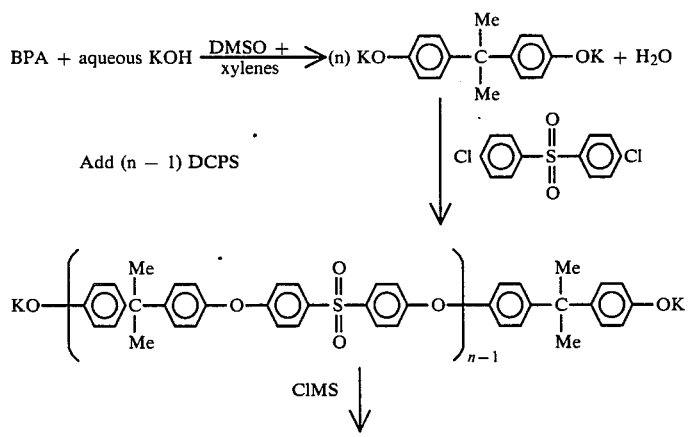

-continued

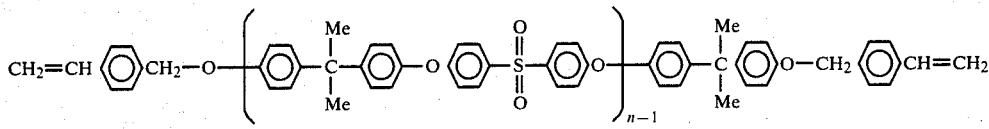

Using a ratio of BPA/DCPS≅3/2, bisphenolates of oligomers ranging in Mn from about 1000 to about 5000 are prepared. When these oligomers are end-capped with styrl groups and crosslinked, the $T_g$ is in the range from about 190°-200° C., and the yields are substantially quantitative, provided the degradation of the DMSO is essentially negated. The ClMS used is the normal mixture of meta/para isomers because no substantial difference in $T_g$ was observed with oligomers prepared from each pure isomer, though the para isomer is more reactive.

A typical pilot plant process using only DMSO as the solvent may be conducted as follows:

In a jacketed reactor equipped with a stirrer, mix 56.1 parts by weight DMSO, 23.8 parts BPA and 13.3 parts 85% pure KOH in 6.8 parts water. The di-potassium salt of BPA is formed and dissolves in the DMSO as does the water of reaction.

This mixture is fed at a flow rate of 12.5 gpm to a 6" diameter stripping column equipped with 9 sieve trays operating at 100 mm Hg.

The overhead is distilled off at about 52° C. and consists of 95 mole percent water and 5 mole percent DMSO. The bottoms temperature is about 125° C. and consists of 1.1 mole percent water and 98.9 mole percent of DMSO-bisphenolate solution which is held in a surge tank from which is withdrawn as desired, to be oligomerized, that is, to form the bisphenolate of the BPA-DPS oligomer. This may be done in the same reactor used to form the bisphenolate of the BPA.

Oligomerization is carried out in a manner analogous to that described in Example 1 hereinabove.

In an analogous manner, bisphenolates of various PAPE oligomers listed hereinbefore are formed, and then end-capped with styryl groups. The bisphenolates may be end-capped with ester groups by reaction with the appropriate HAR. For example, (meth)acryloyl chloride yields methacrylyl chain ends, CEVE yields an APS with ethoxy vinylether chain ends which may then be crosslinked with a conventional initiator. Thus it is evident that in general, the HAR is condensed on each end of the PAPE oligomer with the elimination of salt, NaCl or KCl, which is precipitated as a fine powder in the aprotic solvent, without adversely affecting the formation of the difunctionalized PAPE.

As stated hereinabove, the rate of reaction will depend, inter alia, upon the HAR and the reactant, or, reactive solvent which is chosen to provide the residue $R^s$. It will also be evident that the most desirable oligomers are those formed with a DPS or DPK as an essential moiety. For example, diphenyl sulfide and dichlorophenyl sulfone provide useful oligomers.

Though VB end groups are most preferred, any HAR with a comparably reactive halogen atom at one end and a vinyl group at the other, will provide excellent reaction rates and yields. Similarly, though methacryloyl chloride is the most preferred HAR for esterification, numerous available terminally monohalogenated α,β-unsaturated olefins may be used, most preferably if they include an allylic halide group. For example, 1-chloro-2-hexene is an HAR with desirable allylic halide characteristics. Also useful, but providing a slower reaction rate, is 6-chloro-1-hexene, which is not an allylic halide.

For convenient reference, the following is a list of the acronyms used in the foregoing specification:

| | |
|---|---|
| APS | α,ω-di(phenol)aromatic poly(thio)ether sulfone |
| BCMB | bis(chloromethoxy)butane |
| BPA | bisphenol A |
| BTPA | bisthiophenol A |
| B(T)PA | BPA and/or BTPA |
| BPAS | bisphenol A sulfone |
| BTPAS | bisthiophenol A sulfone |
| B(T)PAS | bisphenol A sulfone and/or bisthiophenol A sulfone |
| BPA(s) | BPA with inert substituents |
| BTPA(s) | bisthiophenol A with inert substituents |
| B(T)PA(s) | BPA(s) or BTPA(s) |
| ClMS | chloromethylstyrene |
| DAPS | difunctionalized APS |
| DCPS | dichlorophenyl sulfone |
| DCPP | phenyl dichlorophosphine oxide |
| DHP | dihydric phenol |
| DHPS | dihalophenyl sulfone |
| DHTP | dihydric thiophenol |
| DH(T)P | dihydric phenol and/or dihydric thiophenol |
| Di-[DHP]$_n$ | difunctionalized poly[dihydric phenol] |
| DMF | dimethyl formamide |
| DMSO | dimethyl sulfoxide |
| DPE | diphenyl ether |
| DPK | diphenyl ketone |
| DPS | diphenyl sulfone |
| HAR | haloalkyl reactant or haloacyl reactant |
| HQ | hydroquinone; 1,4-dihydroxybenzene |
| K-t-Bu | potassium-tert-butoxide |
| PAPE | polyarylene polyether |
| Ph | phenol |
| PTC | phase transfer catalyst, phase transfer catalytic |
| TPh | thiophenol |
| $T_g$ | glass transition temperature |

What is claimed is:

1. A process for forming an α,ω-difunctionalized substantially linear crosslinkable thermoplastic polyarylene polyether oligomer, or polyarylene polythioether oligomer, (difunctionalized PAPE oligomer), from a PAPE oligomer, comprising,
   (a) reacting a first salt of said PAPE oligomer having a molecular weight $\overline{Mn}$ in the range from about 1000 to about 10,000, with a α,β-unsaturated haloacyl reactant ("HAR") essentially quantiatively in an aprotic solvent, in the absence of a phase transfer catalyst ("PTC") at an oligomerization temperature below that required to crosslink said HAR, so as to yield a functional head consisting of the residue of said HAR at each end of said PAPE oligomer;
   (b) precipitating a second salt without simultaneously precipitating a substantial quantity of said difunctionalized PAPE oligomer; and,
   (c) recovering said difunctionalized PAPE oligomer.

2. The process of claim 1 including, prior to step (a), forming a bisphenolate of a dihydric phenol (DHP) in said aprotic solvent at an elevated temperature below that required to degrade said solvent, but sufficiently high to distill the water of reaction formed, in the absence of a phase transfer catalyst, while maintaining the reaction mixture under substantially anhydrous conditions, adding a compound which provides a reactive linking group selected from the group consisting of the same or another dihydric phenol or dihydric thiophenol [DH(T)P]; an α,ω-dihaloalkane having from 1 to about 18 carbon atoms; phosgene; alkyl and aryl diacid halides including dihaloaryl having six ring carbon atoms; dihalophenyl phosphonate; bis(haloalkoxy)alkane having from 3 to about 20 carbon atoms; and, dihalocycloalkanes having from 3 to 7 ring carbon atoms; and, forming said second salt of said PAPE oligomer.

3. The process of claim 2 wherein forming said bisphenolate of said DHP is carried out in a solvent selected from the group consisting of glymes, dimethyl formamide, and sulfur-containing solvents represented by the formula:

wherein R' represents a monovalent hydrocarbon group free of aliphatic unsaturation on the alpha carbon atom, and preferably contains less than about 8 carbon atoms or when connected together represents a divalent alkylene group with z being an integer from 1 to 2 inclusive.

4. The process of claim 3 wherein said aprotic solvent is dimethyl sulfoxide, optionally in combination with an aromatic sulfur-free solvent, and said temperature is in the range from about 90° C. to about 145° C.

5. The process of claim 4 wherein said PAPE oligomer includes a repeating unit represented by the residuum of at least one dihydric phenol optionally substituted with inert substituents, so that said cross-linkable oligomer is represented by the formula:

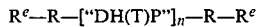

wherein, n is an integer in the range from 2 to about 100;
R represents O or S in an ether or ester linkage with $R^e$;
$R^e$ represents a residuum containing a terminal carbon to carbon double bond at each end of the oligomer; and,
["DH(T)P"] is the residuum of dihydric phenol or dihydric thiophenol moieties linked through a linking residue $R^s$ so as to form a repeating unit

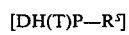

wherein DH(T)P is a residuum having a structure selected from

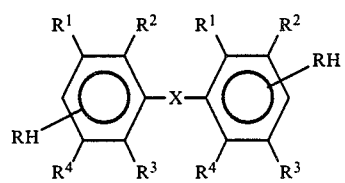

and

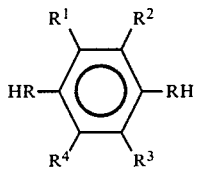

X represents a bond between aromatic carbon atoms or a divalent connecting radical selected friom the group consisting of C=O, —O—, —S—, —S—S—, —SO₂—, —Si— and divalent organic hydrocarbon radicals such as alkylene, alkylidene, cycloaliphatic, or the halogen, alkyl, aryl, substituted alkylene, alkylidene and cycloalkiphatic radicals as well as alkarylene, cycloalkyl and aromatic radicals, and a ring fused to both Ar groups;

$R^1$, $R^2$, $R^3$, and $R^4$ are inert substituents, which if present on any phenyl ring, may each be the same or different and represent halogen, particularly chlorine or bromine; NO₂; alkyl having from 1 to about 18 carbon atoms, without regard for the spatial configuration; alkoxy having from 1 to about 18 carbon atoms; and, hydrogen; and, $R^s$ represents the residuum of said reactive linking group.

6. The process of claim 5 wherein said PAPE oligomer is an aromatic polyether sulfone or aromatic polythioether sulfone oligomer ("APS") represented by the structure:

wherein,
APS represents the residuum of an "APS" oligomer having a backbone which includes a repeating unit selected from the grop consisting of [DPS(s)-BPA(s)]ₙ [DPS(s)-BPA(s)-$R^s$]ₙ [BPA(s)-DPS(s)] [DPS(s)-BTPA(s)]ₙ and [DPS(s)-BTPA(s)-$R^s$]-[BTPA(s)-DPS(s)] n represents an integer in the range from about 1 to about 10;
BPA(s) and BTPA(s) represent the residua of a bis(-thio)phenol ("B(T)PA(s)") represented by a structural formula selected from

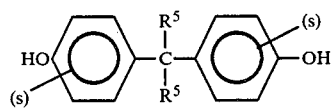

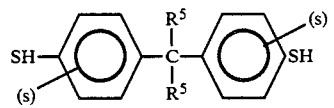

wherein (s) represents H or $R^1$, $R^2$, $R^3$ or $R^4$;
$R^1$, $R^2$, $R^3$ and $R^4$ have the same connotation as that given hereinabove;
$R^5$ represents hydrogen, lower alkyl having from 1 to about 5 carbon atoms, phenyl and the halogen substituents thereof, and $R^5$ may each be the same or different;
DPS(s) represents the residuum of a dihalophenyl sulfone having the structure;

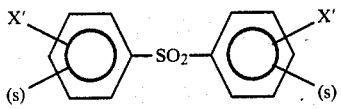

wherein (s) has the same connotation as hereinabove; and,

X' represents halogen selected from the group consisting of fluorine, chlorine, bromine and iodine.

7. The process of claim 6 wherein $R^s$ is a residuum selected from the group consisting of alkenyl having from 1 to about 20 carbon atoms, phenyl phosphine oxide, and aralkenyl having from 7 to about 27 carbon atoms.

8. The process of claim 6 wherein said DPS is the residuum of 4,4'-dichlorodiphenyl sulfone.

9. The process of claim 5 including in addition,
(a) forming a solution of said difunctionalized PAPE oligomer in an organic solvent;
(b) brominating said difunctionalized PAPE oligomer by contacting it with an amount of bromine sufficient to saturate vinyl groups of the functional heads at each end of said PAPE oligomer, that is, one mol equiv of $Br_2$ per double bond of each said vinyl group;
(c) dehydrobrominating the brominated PAPE oligomer by adding sufficient potassium-tert-butoxide to effect said dehydrobromination; and,
(d) recovering a diethynylated PAPE oligomer having one ethynyl group at each end of said PAPE oligomer.

* * * * *

UNITED STATES PATENT AND TRADEMARK OFFICE
CERTIFICATE OF CORRECTION

PATENT NO. : 4,663,402
DATED : May 5, 1987
INVENTOR(S) : Virgil Percec, Gary S. Huvard, Floyd L. Ramp and Lee Traynor It is certified that error appears in the above-identified patent and that said Letters Patent are hereby corrected as shown below:

Column 1, line 30, the formula should read ---[DH(T)P-$R^s$]---.

Column 4, line 58, "when" should read ---which---.

Column 5, line 27, in the formula, the ending should read --- -R-$R^e$---.

Column 6, line 13, "CO=O" should read ---C=O---.

Column 10, line 43, in the formula, there should be a bracket after the first and second "BPA".

Column 10, line 62, in the formula, a bracket is missing after both "BPA".

Column 16, line 17, "cycloaliphatic" is misspelled.

Signed and Sealed this

Tenth Day of May, 1988

Attest:

DONALD J. QUIGG

Attesting Officer   Commissioner of Patents and Trademarks